E. E. ROSE.
VALVE.
APPLICATION FILED JULY 12, 1915. RENEWED DEC. 27, 1916.

1,215,580. Patented Feb. 13, 1917.

WITNESSES:
R. J. Ridge
D. C. Davis

INVENTOR
Edward E. Rose.
BY
Charley G. Carr
ATTORNEY

UNITED STATES PATENT OFFICE.

EDWARD E. ROSE, OF SWISSVALE, PENNSYLVANIA, ASSIGNOR TO WESTINGHOUSE ELECTRIC AND MANUFACTURING COMPANY, A CORPORATION OF PENNSYLVANIA.

VALVE.

1,215,580.  Specification of Letters Patent.  Patented Feb. 13, 1917.

Application filed July 12, 1915, Serial No. 39,363. Renewed December 27, 1916. Serial No. 139,196.

*To all whom it may concern:*

Be it known that I, EDWARD E. ROSE, a citizen of the United States, and a resident of Swissvale, in the county of Allegheny and State of Pennsylvania, have invented a new and useful Improvement in Valves, of which the following is a specification.

My invention relates to valves suitable for maintaining extremely high vacua, and it has for its object to provide means whereby liquid sealing means may be applied to, and removed from, a mechanical closing device in a simple and effective manner.

Figure 1:
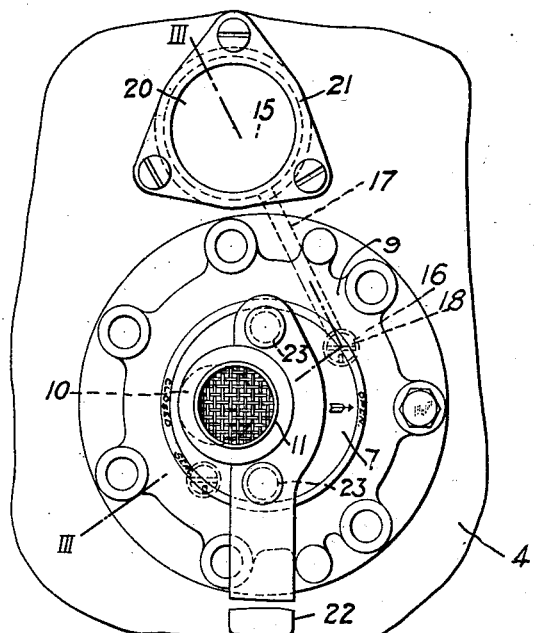
Figure 2:
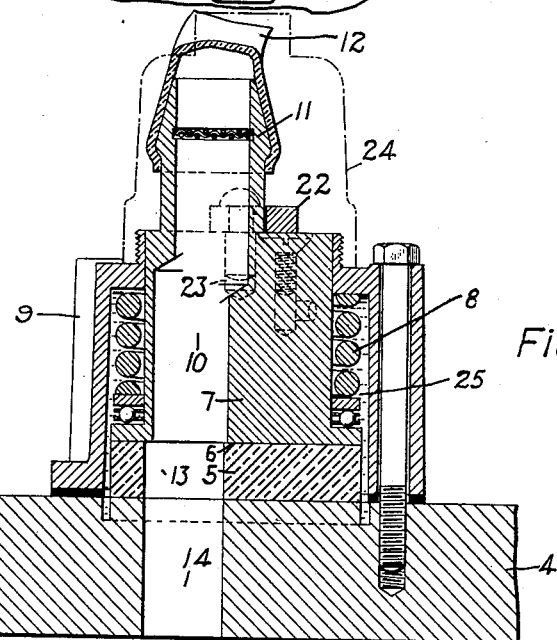
Figure 3:
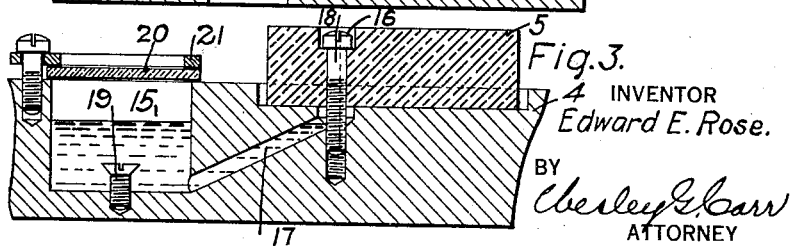

In the accompanying drawing, Figure 1 is a plan view of a valve embodying my invention, together with its operating handle and auxiliary sealing reservoir; Fig. 2 is a side view, principally in section, of the valve shown in Fig. 1; and Fig. 3 is a fragmentary sectional view of the valve shown in Fig. 1, the section plane being indicated by a line III—III in Fig. 1.

In the operation of apparatus embodying high vacua, such, for example, as vapor-arc rectifiers or converters, it is desirable that simple and effective means be provided for connecting and disconnecting a pump from the interior thereof. It has been found practically impossible to devise a valve composed of rigid moving parts which will maintain the desired degree of vacuum, and use has therefore been made of devices wherein the vacuum line is first broken by a suitable mechanical closure and wherein a sealing fluid, such, for example, as mercury, is subsequently admitted over said mechanical closure to seal the same. A device of this character is shown in U. S. Patent #1,001,455, granted to the Westinghouse Electric & Manufacturing Company, Aug. 22, 1911, on an application filed by Yasudiro Sakai.

In my copending application, Serial No. 844,105, filed June 9, 1914, and assigned to the Westinghouse Electric & Manufacturing Company, I have disclosed a valve embodying various improvements in the Sakai structure, chief among which may be mentioned the use of metal to porcelain rubbing surfaces for reducing friction and preventing cutting, and the use of flat sealing seats for ease in manufacture and to prevent leakage due to thermal expansion and like forces.

It is the object of the present invention to simplify and expedite the control of the sealing fluid in valves of the character described.

Briefly speaking, my invention comprises the combination, with mechanical closing means, of a fluid reservoir and an auxiliary passage, whereby sealing fluid is drawn from said reservoir over said mechanical closing means, under the influence of external pressure, and whereby the sealing fluid is then prevented from escaping. When it is desired to reopen the valve, means are provided for raising the pressure in the pump end of the line and for reopening said auxiliary passage, whereby said sealing fluid is allowed to return to the reservoir, and the valve may then be moved to the open position.

Referring to the accompanying drawing for a more detailed understanding of my invention, a base member is shown at 4, such, for example, as the cover of a vapor-arc converter of the metal-case type. A member 5, preferably composed of vitreous material, such, for example, as porcelain, is mounted on the base member 4 and is provided with a flat seat 6 on the upper face thereof. A movable valve member 7 is mounted to rotate on the seat 6 and is yieldingly forced thereagainst by a spring 8 pressing against a cage or casing 9. The member 7 is provided with an eccentrically disposed port or passage 10 therethrough, terminating in a hollow member 11 to which a tube 12 of flexible material, such, for example, as rubber, may be attached. The member 5 is provided with an eccentrically disposed port 13 in alinement with a similar port 14 in the member 4 and adapted to register with the port 10 when the member 7 is turned to the proper position. A reservoir 15 is provided in the base member 4 and communicates with an auxiliary port 16 in the member 5 by means of a passage way 17. The auxiliary port 16 may be conveniently provided by slotting a screw 18 that is employed to fasten the member 5 to the base member 4. The reservoir 15 is normally partially filled with sealing fluid, such as mercury, and is provided with an indicating device 19 in the bottom thereof so that the level of the liquid therein may be readily ascertained by inspection through a transparent cover 20 that is clamped in place by a suitable ring 21. The member 7 may be turned upon the seat 6 by any suitable means, such, for example, as a wrench 22 so shaped as to span the member 11 and engage openings 23 on opposite sides thereof.

Having thus described the structure of my valve, the operation is as follows: When pumping, the member 7 is so turned that the port 10 is in substantial alinement with the ports 14 and 13, and free communication is established from the interior of the container to a pump or other exhaust means connected to the tube 12. When it is desired to disconnect the pump, the member 7 is turned so that the port 10 alines with the auxiliary port 16. The existence of atmospheric pressure upon the surface of the liquid in the reservoir 15 and of a reasonably high degree of vacuum within the tube 12 forces the sealing liquid up through the passage 17 and the port 16 to fill the lower portion of the port 10. The member 17 is then turned farther until the port 10 is completely closed by the seat 6, and the contact between the members 7 and 5 is so intimate that the escape of the sealing fluid is precluded. The tube 12 may then be removed, and a suitable dust cap, indicated by a dotted line 24, may be applied for the protection of the valve. The ingress of air to the container at the outer edge of the seat 6 is prevented by a suitable sealing fluid 25 within the casing 9 and is prevented through the port 10 by a sealing fluid which has just been introduced.

When it is desired to reopen the valve, atmospheric pressure is introduced through the member 11, and the port 10 is moved into registry with the auxiliary port 16, whereupon the sealing fluid within the port 10 returns to the reservoir 15 under the influence of gravity, leaving the port 10 free to be brought into registry with the port 13.

The member 7 may be seated directly upon the base member 4 if desired, but I find that a more satisfactory rubbing contact may be maintained under high vacuum between dissimiliar material, such, for example, as metal and porcelain, rather than between two metallic members.

While I have shown my invention in its simplest and preferred form, it will be obvious to those skilled in the art that it is susceptible of various minor changes and modifications without departing from the spirit thereof and I desire, therefore, that no restrictions shall be placed thereupon except such as are imposed by the prior art or are specifically set forth in the appended claims.

I claim as my invention:

1. The combination with a valve including fixed and movable members, each of which is provided with a port therethrough, of a reservoir containing sealing fluid and communicating with an auxiliary port in one of said members, and means whereby said movable member may be so turned that said auxiliary port will be brought into alinement with one of said main ports and said sealing fluid caused to flow into and seal said main port under the influence of the pressure of the medium within said main port.

2. The combination with a valve including fixed and movable members, each of which is provided with a port therethrough, of a reservoir containing sealing fluid and communicating with an auxiliary port in said fixed member, and means whereby said movable member may be so turned that said auxiliary port will be brought into alinement with the main port therein and said main port will be sealed by fluid from said reservoir under the influence of the pressure of the medium within said port.

3. The combination with a valve including fixed and movable members, each of which is provided with a port therethrough, of a reservoir containing a sealing fluid subject to substantially constant pressure on the surface thereof, an auxiliary port in said fixed member, and means whereby said movable member may be so turned that the main port therein will aline with said auxiliary port and said fluid be drawn up to seal said main port when the pressure therein is less than that on the surface of the fluid in said reservoir.

4. A combined closing and sealing valve for a vacuum line comprising fixed and movable members, each of which is provided with a main port therethrough, said main ports being in alinement in the open position of the valve, a reservoir containing a sealing fluid and subject to atmospheric pressure, an auxiliary port in said fixed member in connection with said fluid, and means whereby said movable member may be turned to bring the port therein into alinement with said auxiliary port in order to draw sealing fluid up thereinto and whereby said movable member may be further turned so that the port therein is closed and sealed.

5. The combination with a vacuum line, of means for mechanically closing said line and for sucking sealing fluid over said mechanical closure.

6. The combination with a vacuum line, of means for mechanically closing said line and for sucking sealing fluid over said mechanical closure, and means for subsequently closing the path of entrance of said sealing fluid.

7. The combination with a vacuum line, of means for mechanically closing said line and for sucking sealing fluid over said mechanical closure, and means for raising the pressure in the portion of said line exposed to the surface of the sealing fluid to allow the escape thereof.

8. The combination with a vacuum line, of means for mechanically closing said line, for then admitting a sealing fluid over said mechanical closure and for then closing the path of entrance of said sealing fluid, and means for raising the pressure within the portion of said line exposed to said sealing fluid, whereby, when said closing means is operated in the reverse direction, the sealing fluid is first permitted to escape and said vacuum line is then reopened.

9. The combination with a vacuum line, of a valve therein comprising fixed and movable members, means for turning said movable members to first close said vacuum line, then to admit sealing fluid under the influence of external pressure and then to prevent the escape of said sealing fluid, and means for raising the pressure within the portion of said line exposed to said sealing fluid, whereby when said movable member is returned to its original position, said sealing fluid is first expelled and said line is then reopened.

10. In a liquid sealed valve arranged for open, closed, and sealing positions, the combination with a base member provided with a horizontally disposed seat, of a valve member mounted to rotate upon said seat and provided with a port therethrough eccentrically disposed at its seated end and in communication with one portion of the fluid line at its other end, said seat being provided with two ports, eccentrically disposed with respect to the axis of rotation of said valve member, one of said ports being in communication with the other portion of the fluid line, and the other of said ports being in communication with a reservoir of sealing liquid, and means whereby said valve member may be turned so that the two fluid line ports are in registry for the open position, the valve port is in registry with the sealing port for the sealing position, and the valve port is closed by said seat in the closed valve position.

11. In a liquid sealed valve arranged for open, closed, and sealing positions, the combination with a base member provided with a horizontally disposed seat, of a valve member mounted to rotate upon said seat and provided with a port therethrough eccentrically disposed at its seated end and in communication with one portion of the fluid line at its other end, said seat being provided with two ports, eccentrically disposed with respect to the axis of rotation of said valve member, one of said ports being in communication with the other portion of the fluid line, and the other of said ports being in communication with a reservoir of sealing liquid, means whereby said valve member may be turned so that the two fluid line ports are in registry for the open position, the valve port is in registry with the sealing port for the sealing position, and the valve port is closed by said seat in the closed valve position, means whereby a substantially uniform pressure may be maintained on the surface of the fluid in said reservoir and means whereby the pressure within the portion of the fluid line connected to said movable member may be adjusted to values either equal to or less than that within said reservoir.

In testimony whereof, I have hereunto subscribed my name this 30th day of June, 1915.

EDWARD E. ROSE.

Copies of this patent may be obtained for five cents each, by addressing the "Commissioner of Patents, Washington, D. C."